(12) United States Patent
Pace et al.

(10) Patent No.: US 8,265,477 B2
(45) Date of Patent: Sep. 11, 2012

(54) STEREO CAMERA WITH PRESET MODES

(75) Inventors: Vincent Pace, Shadow Hills, CA (US); Patrick Campbell, Stevenson Ranch, CA (US)

(73) Assignees: James Cameron, Burbank, CA (US); Vincent Pace, Burbank, CA (US)

( * ) Notice: Subject to any disclaimer, the term of this patent is extended or adjusted under 35 U.S.C. 154(b) by 161 days.

(21) Appl. No.: 12/752,088

(22) Filed: Mar. 31, 2010

(65) Prior Publication Data

US 2011/0243542 A1 Oct. 6, 2011

(51) Int. Cl.
*G03B 35/00* (2006.01)
*H04N 13/00* (2006.01)

(52) U.S. Cl. ......................... 396/324; 348/42

(58) Field of Classification Search .................. 396/322, 396/324, 329; 348/42, 47–48
See application file for complete search history.

(56) References Cited

U.S. PATENT DOCUMENTS

| | | | |
|---|---|---|---|
| 4,286,849 A | 9/1981 | Uchido | |
| 4,557,570 A | 12/1985 | Hines | |
| 4,650,305 A | 3/1987 | Hines | |
| 4,725,863 A | 2/1988 | Dumbreck et al. | |
| 4,751,570 A | 6/1988 | Robinson | |
| 4,881,122 A | 11/1989 | Murakami | |
| 4,999,713 A | 3/1991 | Ueno et al. | |
| 5,175,616 A | 12/1992 | Milgram | |
| 5,184,169 A | 2/1993 | Nichitani | |
| 5,416,556 A | 5/1995 | Suzuki | |
| 5,699,108 A | 12/1997 | Katayama et al. | |
| 5,740,337 A | 4/1998 | Okino et al. | |
| 5,801,760 A | 9/1998 | Uomori | |
| 5,864,360 A * | 1/1999 | Okauchi et al. | 348/47 |
| 5,978,015 A | 11/1999 | Ishibashi et al. | |
| 6,414,709 B1 | 7/2002 | Palm et al. | |
| 6,512,892 B1 | 1/2003 | Montgomery et al. | |
| 6,701,081 B1 | 3/2004 | Dwyer et al. | |
| 6,798,406 B1 | 9/2004 | Jones et al. | |
| 7,190,389 B1 | 3/2007 | Abe et al. | |
| 7,899,321 B2 * | 3/2011 | Cameron et al. | 396/325 |
| 2005/0190180 A1 | 9/2005 | Jin et al. | |
| 2006/0170783 A1 * | 8/2006 | Stavely et al. | 348/208.6 |
| 2006/0204240 A1 | 9/2006 | Cameron et al. | |
| 2007/0296809 A1 | 12/2007 | Newbery | |
| 2008/0225129 A1 * | 9/2008 | Viinikanoja et al. | 348/218.1 |

OTHER PUBLICATIONS

World Intellectual Property Organization, International Search Report and Written Opinion for International Application No. PCT/US2011/030369, mail date May 27, 2011.

(Continued)

*Primary Examiner* — W. B. Perkey
*Assistant Examiner* — Minh Phan
(74) *Attorney, Agent, or Firm* — SoCal IP Law Group LLP; John E. Gunther; Steven C. Sereboff (57) ABSTRACT

There is disclosed a stereographic camera system and method. A stereographic camera may include a left camera and a right camera including respective lenses and an interface for receiving a selection of a selected mode from a plurality of preset operating modes. One or more preset stereo parameters associated with each of the plurality of operating modes may be stored in a preset parameter memory. An interocular distance mechanism may set an interocular distance between the left camera and the right camera based on, at least in part, the one or more preset stereo parameters associated with the selected mode.

29 Claims, 7 Drawing Sheets

OTHER PUBLICATIONS

Unknown, "21st Century 3D Introduces Uncompressed 4:4:4 Stereoscopic Camera System—3DVX3", SPIE Stereoscopic Displays and Applications Conference; avail. Http://www.21stcentury3d.com/press/pr-060117-3dvx3.html; printed Sep. 11, 2008, 3pp.

Unknown, "21st Century 3D Introduces New Digital Steroscopic Motion Picture Camera System", avail. http://fullcamera.com/article/cfm/id/281457, printed Sep. 11, 2008, 2pp.

Matt Hurwitz, "Dreaming in 3D", CineGear Expo News, The Official CineGear Expo Show Newspaper, Jun. 3-5, 2005, pp. 18-19.

* cited by examiner

PRESET PARAMETERS

| Preset Operating Mode | IOD (1) | AMOD (1) | AEOD (1) | MD (1, 2) | CD | Other |
|---|---|---|---|---|---|---|
| Portrait | Narrowest | = FD | 10 feet | 1% | = FD + 10% | Large aperture |
| Interior | Narrow | 6 feet | 30 feet | 1% | = FD | Small aperture |
| Sport | Wide | 15 feet | 150 feet | 1% | = FD | Fast speed |
| Scenery | Widest | 50 feet | Infinite | 1% | = FD | Small aperture |

(1) For a given preset mode, the parameters may include either IOD or MOD/EOD/MD (2) MD = Maximum disparity as a fraction of the image width.

FIG. 7

STEREO CAMERA WITH PRESET MODES

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on objects afar, our eyes rotate towards a parallel view. The angle between the lines of sight of each eye is commonly termed the convergence angle. The convergence angle is higher when we view objects closer to our eyes and lower when viewing distant objects. The convergence angle may be essentially zero, indicating essentially parallel lines of sight, when we view objects at great distance.

Three dimensional imaging, also known as stereographic imaging, dates at least as far back as 1838. Historically, stereographic cameras commonly included two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. The amount of disparity that a viewer can accommodate, commonly called the disparity limit, varies among viewers. The disparity limit is also known to vary with image content, such as the size of an object, the proximity of objects within an image, the color of objects, and the rate of motion of objects within the image. The disparity limit, expressed as the angle between the lines of sight of the viewer's eyes, may be about 12-15 minutes of arc for typical stereoscopic images.

A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Preparing a conventional, non-stereographic camera to record two-dimensional images typically involves setting an aperture or lens speed, a shutter or exposure speed, a lens focal length or zoom, and a lens focus distance. Both still picture and video cameras for consumer use commonly include a method for selecting preset operating modes that set at least some of these parameters to predetermined values. Common preset modes include portrait (typically sets a large aperture), sport (typically sets a fast shutter speed), and landscape (typically sets a small aperture). Users of stereographic cameras may need to set additional parameters, including an interocular distance and a convergence angle.

Throughout this description, elements appearing in schematic diagrams and block diagrams are assigned three-digit reference designators, where the most significant digit is the figure number and the two least significant digits are specific to the element. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
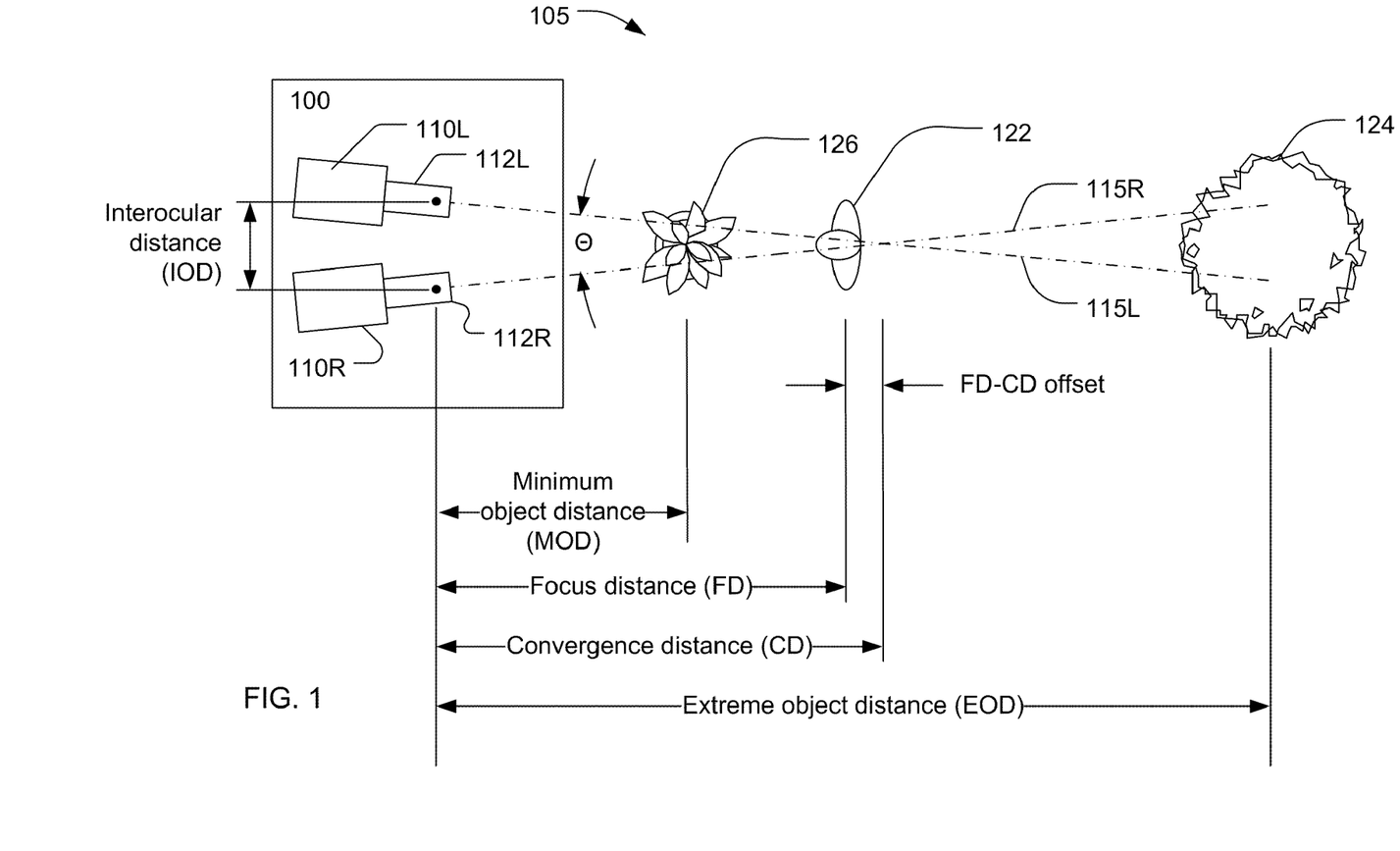
FIG. 1 is a schematic drawing of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. The left and right cameras 110L, 110R may be separated by an interocular distance IOD. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The cameras 110L, 110R may be disposed such that the axes 115L, 115R are parallel or such that a convergence angle Θ is formed between the two axes 115L, 115R. The cameras 110L, 110R may be disposed such that the axes 115L, 115R cross at a convergence distance CD from the cameras. The interocular distance IOD, the convergence distance CD, and the convergence angle Θ are related by the formula $$\Theta = 2A\,\text{TAN}(IOD/2CD), \text{ or} \quad (1)$$

$$CD = IOD/[2\,\text{TAN}(\Theta/2)]. \quad (2)$$

The interocular distance IOD and the convergence distance CD may be measured from a nodal point, which may be the center of an entrance pupil, within each of the lenses 112L, 112R. Since the entrance pupils may be positioned close to the front of the lenses 112L, 112R, the interocular distance IOD and the convergence distance CD may be conveniently measured from the front of the lenses 112L, 112R.

The stereographic camera 100 may be used to form a stereographic image of a scene 105. As shown in the simplified example of FIG. 1, the scene 105 may include a primary subject 122, which is shown, for example, as a person. The scene 105 may also include other features and objects in the background (behind the primary subject) and the foreground (in front of the primary subject). The distance from the cameras 110L, 110R to the furthest background object 124, which is shown as a tree, may be termed the extreme object distance EOD. The distance from the cameras 110L, 110R to the closest foreground object 126, which is shown as a plant, may be termed the minimum object distance MOD.

When the images from a stereographic camera, such as the stereographic camera 100, are displayed on a viewing screen, scene objects at the convergence distance will appear to be in the plane of the viewing screen. Scene objects, such as the primary subject 122 and the foreground object 126 in the example of FIG. 1, located closer to the stereographic camera may appear to be in front of the viewing screen. Scene objects, such as the tree 124, located further from the stereographic camera may appear to be behind the viewing screen.

Each lens 115L, 115R may have adjustable focus. The stereographic camera may have a focus adjusting mechanism to synchronously adjust the focus of the two lenses such that both lenses 115L, 115R may be focused at a common adjustable focus distance FD. The focus adjusting mechanism may couple the focus of the two lenses 115L, 115R mechanically, electrically, electromechanically, electronically, or by another coupling mechanism. The focus distance FD may be adjusted manually, or may be automatically adjusted. The focus distance FD may be adjusted such that the cameras 110L, 110R are focused on the primary subject 130. The focus distance may be automatically adjusted in response to a sensor (not shown) that determines the distance from the cameras 110L, 110R to the primary subject 122. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 122. However, as shown in FIG. 1, the convergence distance CD and the focus distance FD may not be the same distance. For example, the focus distance FD may be set at the distance from the cameras to the primary subject 122 and the convergence distance CD may be set slightly longer than the focus distance. In this case, when the images are displayed, the primary subject 122 will be seen to be in front of the plane of the viewing screen. The difference between the focus distance FD and the convergence distance CD may be an adjustable or predetermined offset. The offset may be absolute, in which case the convergence distance may be calculated by the formula $$CD = FD + \alpha \quad (3)$$

where α is the offset as an absolute dimension. The offset may be relative, in which case the convergence distance may be calculated by the formula $$CD = (FD)(1 + \beta) \quad (4)$$

where β is the offset as a portion of FD. For example, an absolute offset α may be a distance measurement such as one foot or two meters, and a relative offset β may be an expression of a relationship or ratio, such as 5% or 10%. Both the absolute offset and the relative offset may be zero, in which case CD=FD.

Each lens 115L, 115R may also have zoom capability, which is to say that the focal length FL of each lens may be adjusted. The stereographic camera 100 may have a focal length adjusting mechanism to synchronously adjust the focal length of the two lenses such that both lenses 115L, 115R may always have precisely the same focal length. The focal length adjustment of the two lenses 115L, 115R may be coupled mechanically, electrically, electronically, electromechanically, or by another coupling mechanism. Commonly, the focal length of the lenses 115L, 115R may be adjusted manually. The focal length of the two lenses 115R, 115L may also be adjusted automatically in accordance with a predetermined scenario.

Figure 2:
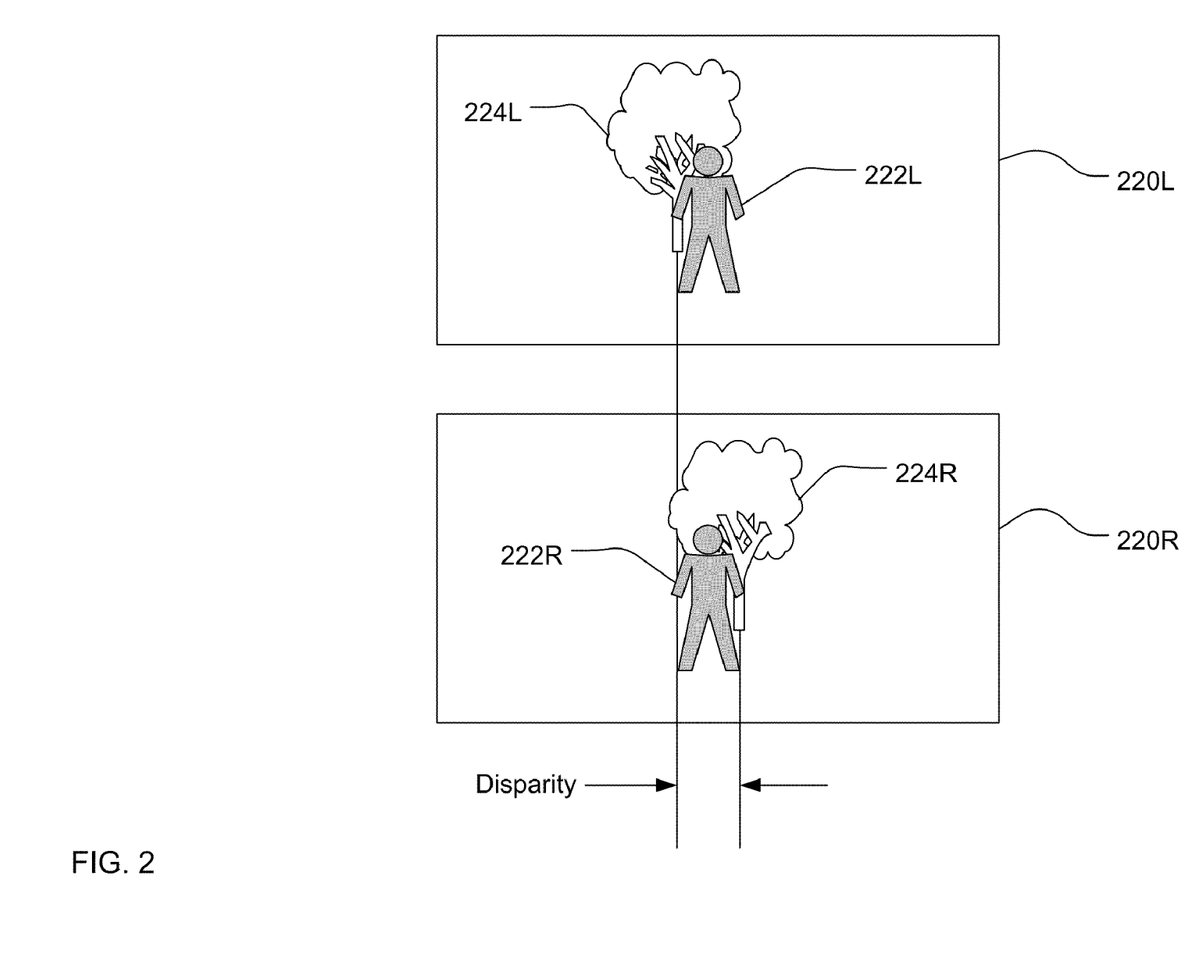
FIG. 2 is a representation of images captured by a stereographic camera.

Referring now to FIG. 2, an exemplary image captured by a left camera is illustrated as displayed on a screen 220L and an exemplary image captured by a right camera is illustrated as displayed on a second screen 220R. The image displayed on the screen 220L includes an image 222L of a primary subject near the center of the display screen, and an image 224L of an extreme background object to the left of the image of the primary subject 222L. The image displayed on screen 220R includes an image 222R of the primary subject near the center of the display screen, and an image 224R of the extreme background object to the right of the image of the primary subject 222R.

The positional difference, or disparity, between corresponding objects in the left image 220L and the right image 220R may provide an illusion of depth when the two images are viewed separately by the left and right eyes of an observer. However, to preserve the illusion of depth, the maximum disparity must be less than a limit value which may be both viewer-dependent and image-dependent. In the example of FIG. 2, the largest disparity occurs between the images 224L, 224R of the extreme background object.

Figure 3:
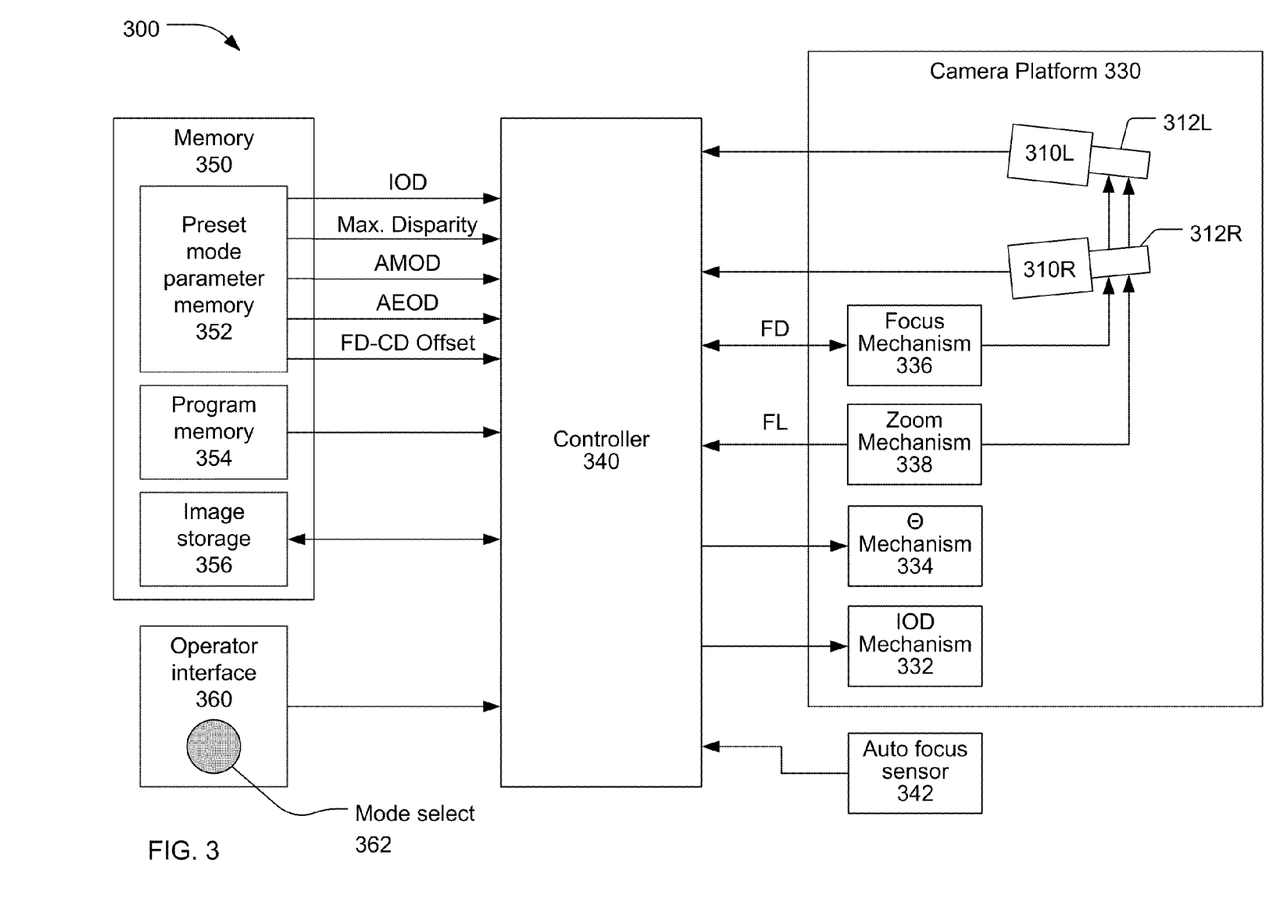
FIG. 3 is a block diagram of a stereographic camera system.

Referring now to FIG. 3, a stereographic camera system 300 may include a camera platform 330, a memory 350, and an operator interface 360, each of which may be coupled to a controller 340. The camera platform 330 may include a left camera 310L and a right camera 310R, each of which has an associated lens 312L, 312R. Each of the left and right cameras 310L/R may include one or more solid state image sensors such as charge-coupled devices (CCD) sensors. Each of the left and right cameras 310L/R may provide respective image signals to the controller 340.

The controller 340 may include one or more of general-purpose processors such as microcomputers, signal processors, application specific integrated circuits, programmable gate arrays or logic arrays, and other analog and/or digital circuits. All or portions of the controller 340 may be implemented by software and/or firmware executed by one or more processors. The controller 340 may be coupled to a memory 350 which may include read-only memory, random access (read/write) memory, and nonvolatile writable memory. The memory 350 may include a program memory 354, an image storage memory 356, a preset mode parameter memory 352, and working memory (not shown) for use by the controller 340.

The program memory 354 may be a read-only or nonvolatile writable memory for storing program instructions for execution by the controller 340. The image storage memory 356 may be a nonvolatile writable memory for storing images captured by the stereographic camera system 300. The image storage memory 356 may be removable from the stereographic camera system 300 or may be external to the stereographic camera system 300. The preset mode parameter memory 352 may be a read-only or nonvolatile memory for storing parameters defining each of a plurality of preset operating modes of the stereographic camera system 300.

The preset mode parameter memory 352 may store a respective plurality of preset parameters associated with each of the plurality of preset operating modes. The plurality of preset parameters associated with each operating mode may include one or more stereo parameters. In this patent, the term "stereo parameter" means a camera operating parameter unique to stereographic cameras and not required by 2D cameras. Stereo parameters that may be included in each plurality of preset parameters are an interocular distance, a convergence distance, convergence distance to focus distance offset, maximum allowable disparity, an assumed extreme object distance, an assumed minimum object distance, and other parameters. Other parameters such as lens aperture, shutter/exposure speed, and parameters for controlling an electronic flash, which may not be unique to stereographic cameras, may also be stored in the preset mode parameter memory.

The camera platform 330 may include an IOD mechanism 332 to adjust an interocular distance between the left camera 310L and the right camera 310R. The camera platform may include a Θ mechanism 334 to adjust a convergence angle between the left camera 310L and the right camera 310R. Both the IOD mechanism 332 and the Θ mechanism 334 may include one or more movable platforms or stages coupled to motors or other actuators. The IOD mechanism 332 and the Θ mechanism 334 may be adapted to set the interocular distance and the convergence angle, respectively, in response to data received from the controller 340. Within this patent, the term "data" is intended to include digital data, commands, instructions, digital signals, analog signals, optical signals and any other data that may be used to communicate the value of a parameter such as interocular distance or convergence angle.

The camera platform 330 may include a focus mechanism 336 to synchronously adjust and set the focus distance of the lenses 312L, 312R. The focus mechanism 336 may include a mechanical, electronic, electrical, or electro-mechanical linkage between the lenses 312L, 312R to simultaneously adjust the focus distance of both lenses to the same value. The focus mechanism 336 may include a motor or other actuator adapted to set the focus distance in response to data received from the controller 340. The focus mechanism 336 may be manually controlled by a user by means of a knob or ring or other manual actuator incorporated into the focus mechanism 336. When manually controlled, the focus mechanism 336 may include an encoder, potentiometer, or other sensor to provide data indicating the focus distance to the controller 340. The focus mechanism 336 may be adapted to operate under manual control and/or in response to data received from the controller 340.

The user interface 360 may include a focus control (not shown) to allow the user to set the focus distance of the lens 312L, 312R. The focus control may be, for example, a knob, a wheel, one or more buttons, a joystick, or other input device by which the user may increase and decrease the focus distance of the lenses 312L, 312R. The user interface 360 may send data to the controller 340 indicating that the user has activated the focus control to change the focus distance, and the controller may send data to the focus mechanism 336 to change the focus distance of the lenses 312L, 312R accordingly.

The camera system may be configured to automatically set the focus distance of the lenses 312L, 312R. The camera system 300 may include an auto focus sensor 342 to automatically measure the distance to a primary object in a scene. The auto focus sensor 342 may send data to the controller 340 indicating the distance to the primary object, and the controller may send data to the focus mechanism 336 to change the focus distance of the lenses 312L, 312R accordingly.

In addition to, or instead of, using the auto focus sensor 342, the controller 340 may determine an appropriate focus distance for the lenses 312L, 312R by analyzing the image signal from one or both of the cameras 310L, 310R. For example, the controller 340 may cause the focus mechanism 336 to vary the focus distance of the lenses 312L, 312R while analyzing the high spatial frequency components of all or a portion of the images captured by one or both of the cameras 310L, 310R. The controller 340 may determine the proper focus distance as the focus distance that maximizes the high spatial frequency content of the images, and the controller may send data to the focus mechanism 336 to change the focus distance of the lenses 312L, 312R accordingly.

The camera platform 330 may include a zoom mechanism 338 to synchronously adjust and set the focal length of the lenses 312L, 312R. The zoom mechanism 338 may include a mechanical, electronic, electrical, or electro-mechanical linkage between the lenses 312L, 312R to simultaneously adjust the focal length of both lenses to the same value. The zoom mechanism 338 may include a motor or other actuator adapted to set the focal length in response to data received from the controller 340. The zoom mechanism 338 may be manually controlled by a user by means of a knob or ring or other manual actuator incorporated into the zoom mechanism 338. When manually controlled, the zoom mechanism 338 may include an encoder, potentiometer, or other sensor to provide data indicating the focal length to the controller 340. The zoom mechanism 338 may be adapted to operate either under manual control or in response to data received from the controller 340.

The user interface 360 may include a zoom control (not shown) to allow the user to set the focal length of the lens 312L, 312R. The zoom control may be, for example, a knob, a wheel, one or more buttons, a joystick, or other input device by which the user may increase and decrease the focal length of the lenses 312L, 312R. The user interface 360 may send data to the controller 340 indicating that the user has activated the zoom control to change the focal length, and the controller may send data to the zoom mechanism 338 to change the focal length of the lenses 312L, 312R accordingly.

The controller 340 may be adapted to determine values for the interocular distance IOD and the convergence angle Θ based on the focal length and focus distance of the lenses 312L, 312R; an extreme object distance, a minimum object distance, a convergence distance to focus distance offset as defined in FIG. 1; and a maximum allowable disparity value. Specific algorithms for determining IOD and Θ will be provided in the subsequent Description of Processes.

When a stereographic camera system is used for cinematic recording, the extreme object distance and the minimum object distance may be measured or otherwise determined, and the maximum disparity and the convergence distance to focus distance offset may be set by a professional cinematographer/stereographer. During cinematic recording, the extreme object distance, the minimum object distance, the maximum disparity, and the convergence distance to focus distance offset may be entered into a stereographic camera system manually through an operator interface, automatically via a data bus or communications link, or by some other method such that IOD and Θ can be determined and set automatically based on lens focal length and focus distance.

When a stereographic camera system, such as the stereographic camera system 300, is used by a professional cameraman or a consumer to record live events, it may not be practical to determine the extreme or minimum object distances or to set the maximum disparity and the convergence distance to focus distance offset for each shot or take. To facilitate operation by inexperienced users and/or recording live events, the operator interface 360 may include a preset mode select control 362 to allow a user to select from the plurality of preset modes, where each preset mode defines a specific combination of values for some or all of an interocular distance IOD, an assumed extreme object distance AEOD, an assumed minimum object distance AMOD, a maximum disparity MD, and a convergence distance to focus distance (CD-FD) offset. Each preset mode may also define other parameters such as lens aperture and shutter/exposure speed. The preset mode selection control 362 may be a rotary switch, as shown for example in FIG. 3, or soft keys or a menu provided on a display within the user interface 360, or some other control device.

When the user selects one of the plurality of preset operating modes, the user interface 360 may send data indicating the selected mode to the controller 340. The controller 340 may retrieve the plurality of preset mode parameters associated with the selected operating mode from the preset mode parameter memory 352. The controller may then send data to the various mechanisms on the camera platform 330 to configure the camera system 300 in accordance with the selected preset operating mode.

Description of Processes

Figure 4:
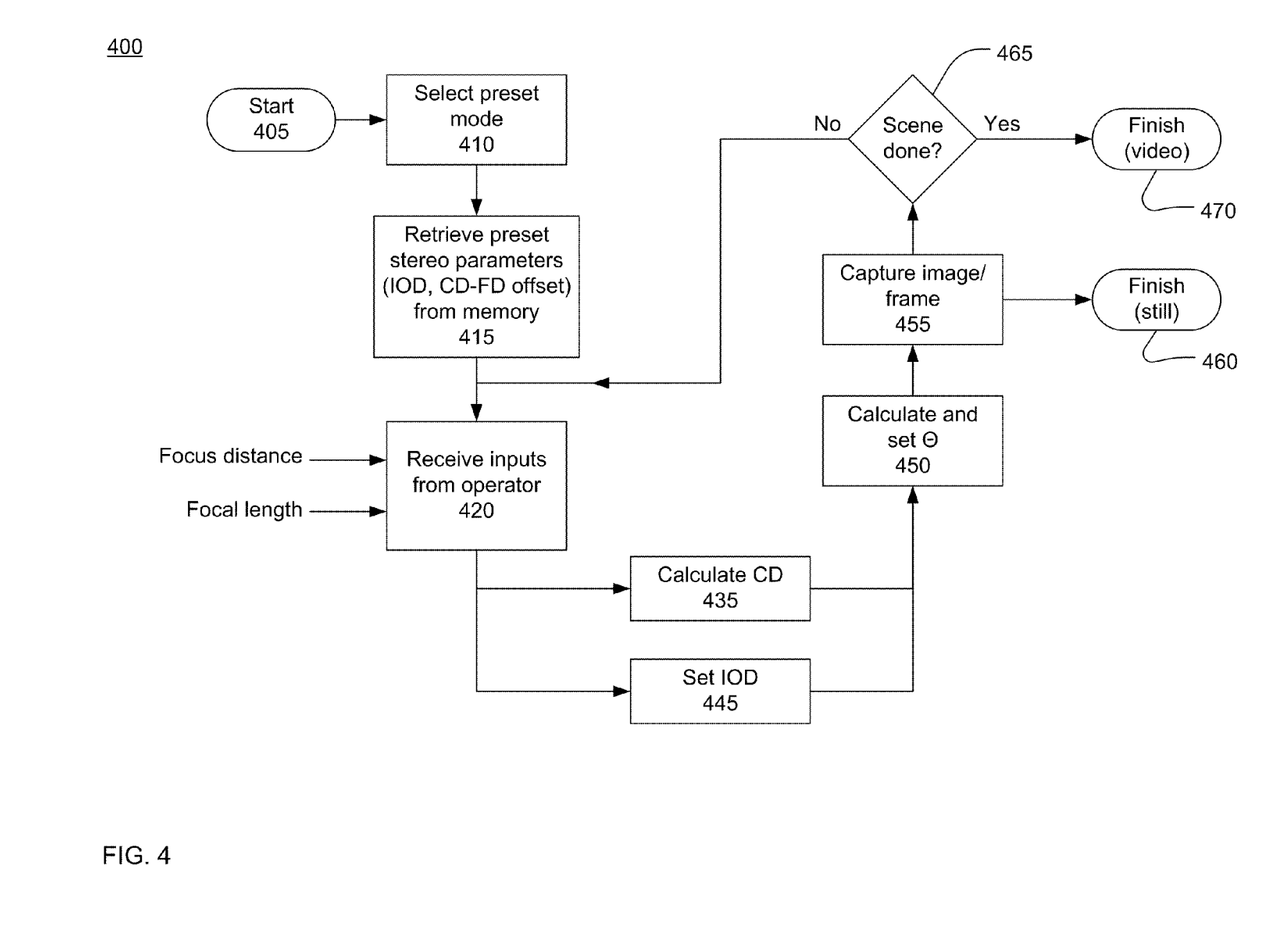
FIG. 4 is a flow chart of a process for recording stereo images.

FIG. 4 is a flow chart of an exemplary process 400 for recording stereographic images using a stereographic camera system such as the stereographic camera system 300. Specifically, FIG. 4 is a flow chart of a process for recording either a still picture or a video take wherein an interocular distance between left and right cameras is fixed at a preset value for each of a plurality of preset operating modes, and the focus distance and the focal length (zoom) of the camera lenses are manually controlled. In this patent, the term "take" has the conventional meaning of "the uninterrupted photographing of a single scene or part of a scene." The flow chart has a start 405 and an end 460 for recording a single still picture. The flow chart starts at 405 and ends at 470 for recording a video take, but the process for recording a video take is continuous in nature and the actions within the process may be performed continuously and in near-real time during the recording of the take. Additionally, the process 400 may be repeated for each individual still picture or video take that is recorded.

Within this patent, the phrase "near-real time" means in real time except for processing delays that are very short compared with temporal events in the take being recorded.

At 410 an operating mode may be selected from a plurality of preset operating modes. The operating mode may be selected by an operator via an operator interface, which may be a portion of the stereographic camera system. The operator interface may be remote from the stereographic camera system and may be coupled to the stereographic camera system by a communications link.

At 415 a plurality of preset parameters, including one or more stereo parameter, associated with the selected operating mode may be retrieved. The plurality of preset parameters may be retrieved, for example, from a preset parameter memory within the stereographic camera system. The plurality of preset parameters associated with the selected operating mode may include an interocular distance parameter. The plurality of preset parameters associated with the selected operating mode may also include a convergence distance to focus distance offset parameter.

At 420, a focus distance and a lens focal length may be set by the operator. For example, the operator may set the focus distance and the lens focal length using respective controls which may be located on the stereographic camera system or on a remote operator interface.

At 435, a convergence distance CD may be determined based on the focus distance received at 420 and the convergence distance to focus distance offset parameter retrieved at 415. For example, the convergence distance may be determined using formula (3) or formula (4). When the plurality of preset parameters associated with the selected operating mode does not include a convergence distance to focus distance offset parameter, the convergence distance may be determined to be equal to the focus distance. At 445, an interocular distance IOD between left and right cameras of the stereographic camera system may be set in accordance with the interocular distance parameter retrieved at 415. The actions at 435 and 445 may be done concurrently or in any order.

At 450, the convergence angle Θ may be calculated and set. The convergence angle Θ may be calculated from the convergence distance CD from 435 and the interocular distance IOD set at 445 using formula (I) as described above.

The convergence distance CD, the interocular distance IOD, and the convergence angle Θ may be calculated at 435, 445, and 450 by a controller, such as the controller 340. The controller may send data to mechanisms on a camera platform to set IOD and Θ accordingly.

At 455, a still picture or a frame of a video take may be captured and stored in an image memory. When a still image has been captured, the process 400 may end at 460. When a frame of a video take has been captured, a determination may be made at 465 if the recording of the take has been completed. If the recording is ongoing, the process 400 may repeat continuously and in near real-time from 415. When the recording of a take has been completed, the process 400 may finish at 470. Subsequently, the process 400 may start again from 405 to record the next still picture or video take.

Figure 5:
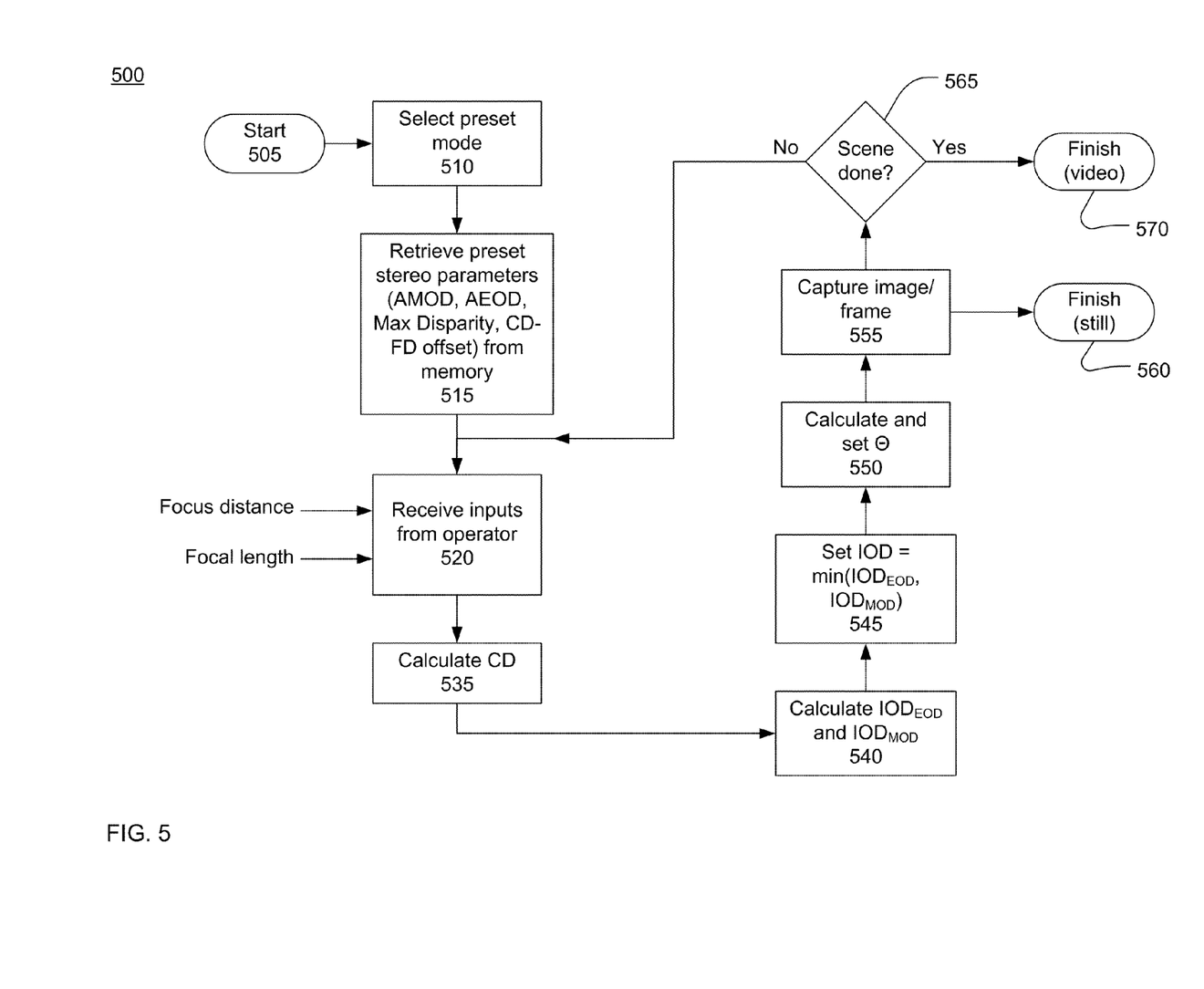
FIG. 5 is a flow chart of a process for recording stereo images.

FIG. 5 is a flow chart of another exemplary process 500 for recording stereographic images using a stereographic camera system such as the stereographic camera system 300. Specifically, FIG. 5 is a flow chart of a process for recording either a still picture or a video take wherein the focus distance and the focal length (zoom) of the camera lenses are manually controlled, and the interocular distance is determined, in part, based on the focus distance and focal length. The flow chart has a start 505 and an end 560 for recording a single still picture. The flow chart starts at 505 and ends at 580 for recording a video take, but the process for recording a video take is continuous in nature and the actions within the process may be performed continuously and in near-real time during the recording of the take. Many of the actions in the process 500 are the same as the corresponding actions of the process 400, and duplicate descriptions of similar actions will not be provided.

At 515 a plurality of preset parameters, including one or more stereo parameter, associated with an operating mode selected at 510 may be retrieved. The plurality of preset parameters associated with the selected operating mode may include at least one of an assumed extreme object distance AEOD and an assumed minimum object distance AMOD. The plurality of preset parameters associated with the selected operating mode may also include a maximum disparity parameter and a convergence distance to focus distance CD-FD offset parameter.

At 540 two potential values for IOD may be calculated. $IOD_{EOD}$ is based on the disparity introduced by a hypothetical background object located at the assumed extreme object distance (AEOD) from the stereographic camera system. $IOD_{MOD}$ is based on the disparity introduced by a hypothetical foreground object located at the assumed minimum object distance (AMOD) from the stereographic camera system. $IOD_{EOD}$ may be calculated using the formula $$IOD_{EOD}=(AEOD \times CD \times MD \times W)/[(AEOD-CD) \times FL] \quad (7)$$

wherein
$IOD_{EOD}$=an interocular distance based on AEOD
W=a width of an image sensor within each camera
FL=the focal length of the lenses
AEOD=the assumed extreme object distance parameter
MD=the maximum disparity parameter as a fraction of the width of the scene recorded by the stereographic camera
CD=the convergence distance determined at 535.
$IOD_{MOD}$ may be calculated using the formula $$IOD_{MOD}=(AMOD \times CD \times MD \times W)/[(CD-AMOD)'FL] \quad (8)$$

wherein
$IOD_{MOD}$=an interocular distance based on AMOD
W=a width of an image sensor within each camera
FL=the focal length of the lenses
AMOD=the minimum object distance parameter
MD=the maximum disparity parameter as a fraction of the width of the scene recorded by the stereographic camera
CD=the convergence distance determined at 535.

At 545, the IOD of the stereographic camera may be set to the minimum of $IOD_{EOD}$ and $IOD_{MOD}$. In some of the preset modes, IOD may be set to $IOD_{EOD}$ based on the assumption that there are no foreground objects in the scene to be recorded. When the plurality of preset parameters associated with the selected operating mode does not include a maximum disparity value, a default maximum disparity value may be used. The default maximum disparity parameter may be used for all of the plurality of preset operating modes.

Figure 6:
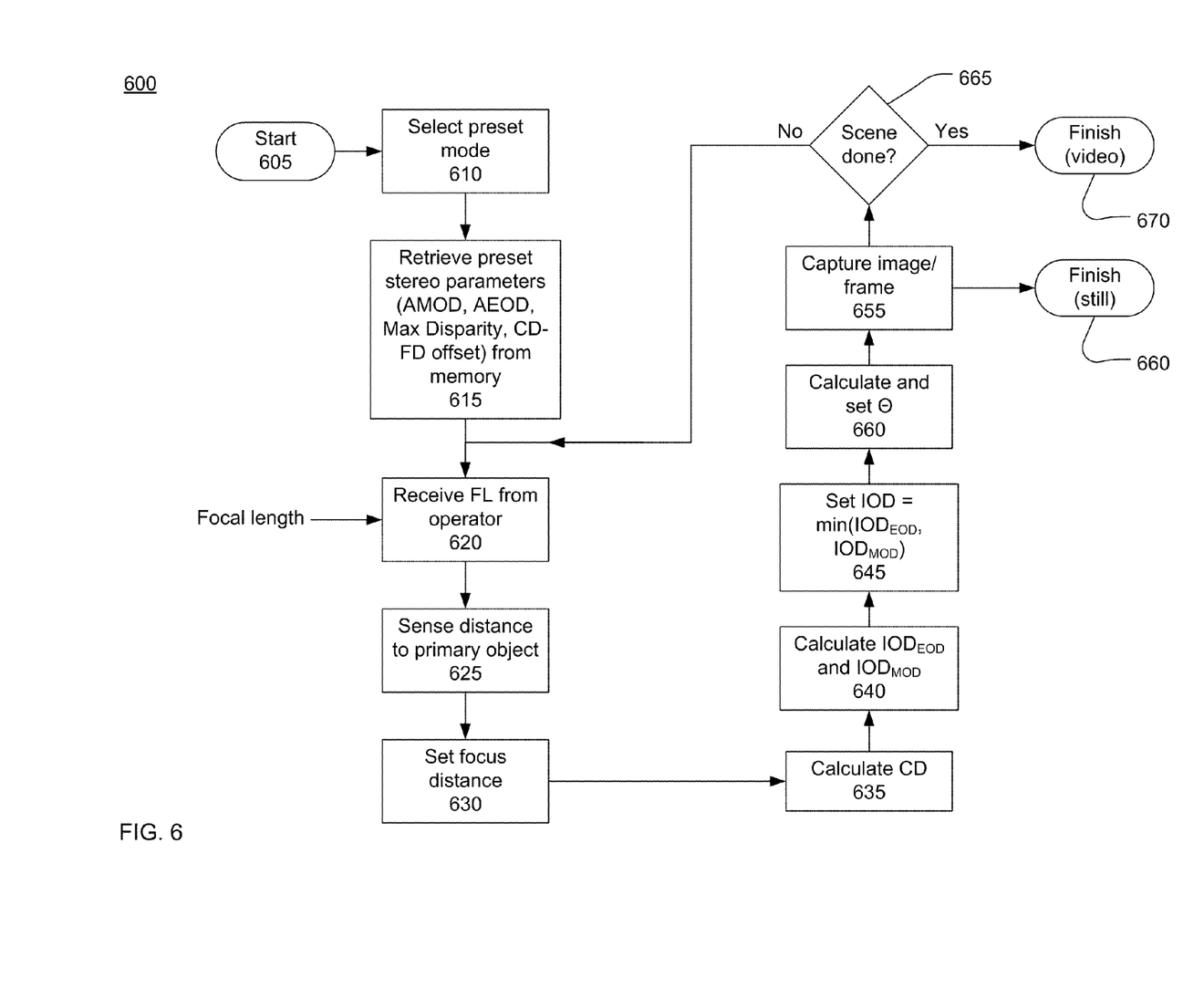
FIG. 6 is a flow chart of a process for recording stereo images.

FIG. 6 is a flow chart of another exemplary process 600 for recording stereographic images using a stereographic camera system such as the stereographic camera system 300. Specifically, FIG. 6 is a flow chart of a process for recording either a still picture or a video take wherein the focal length (zoom) of the camera lenses is manually controlled, the focus distance of the lenses is set automatically, and the interocular distance is determined, in part, based on the focus distance and focal length. The flow chart has a start 505 and an end 560 for recording a single still picture. The flow chart starts at 605 and ends at 680 for recording a video take, but the process for recording a video take is continuous in nature and the actions within the process may be performed continuously and in near-real time during the recording of the take. Many of the actions in the process 600 are the same as the corresponding actions of the process 500 and/or the process 400, and duplicate descriptions of similar actions will not be provided.

At 620, the focal length of lenses within the stereographic camera may be set by as operator. At 630, a distance to a primary object in the scene to be recorded may be sensed. The distance to the primary object may be sensed using a range finding device such as an acoustic, radio frequency or optical range finder. For example, an infrared optical range finding device may sense the distance to an object at the center of the scene. The distance to the primary object may be sensed by automatically varying the focus distance of the lenses while analyzing an image captured by one or both of the cameras of the stereographic camera system. When image analysis is used to determine the distance to the primary object, the primary object may also be identified by image analysis such as face detection analysis.

At 630, the focus distance of the lenses may be automatically set to equal the distance to the primary object as determined at 625. After the focus distance of the lenses is set, the actions from 635 through 670 may proceed as described in conjunction with FIG. 5.

Figure 7:
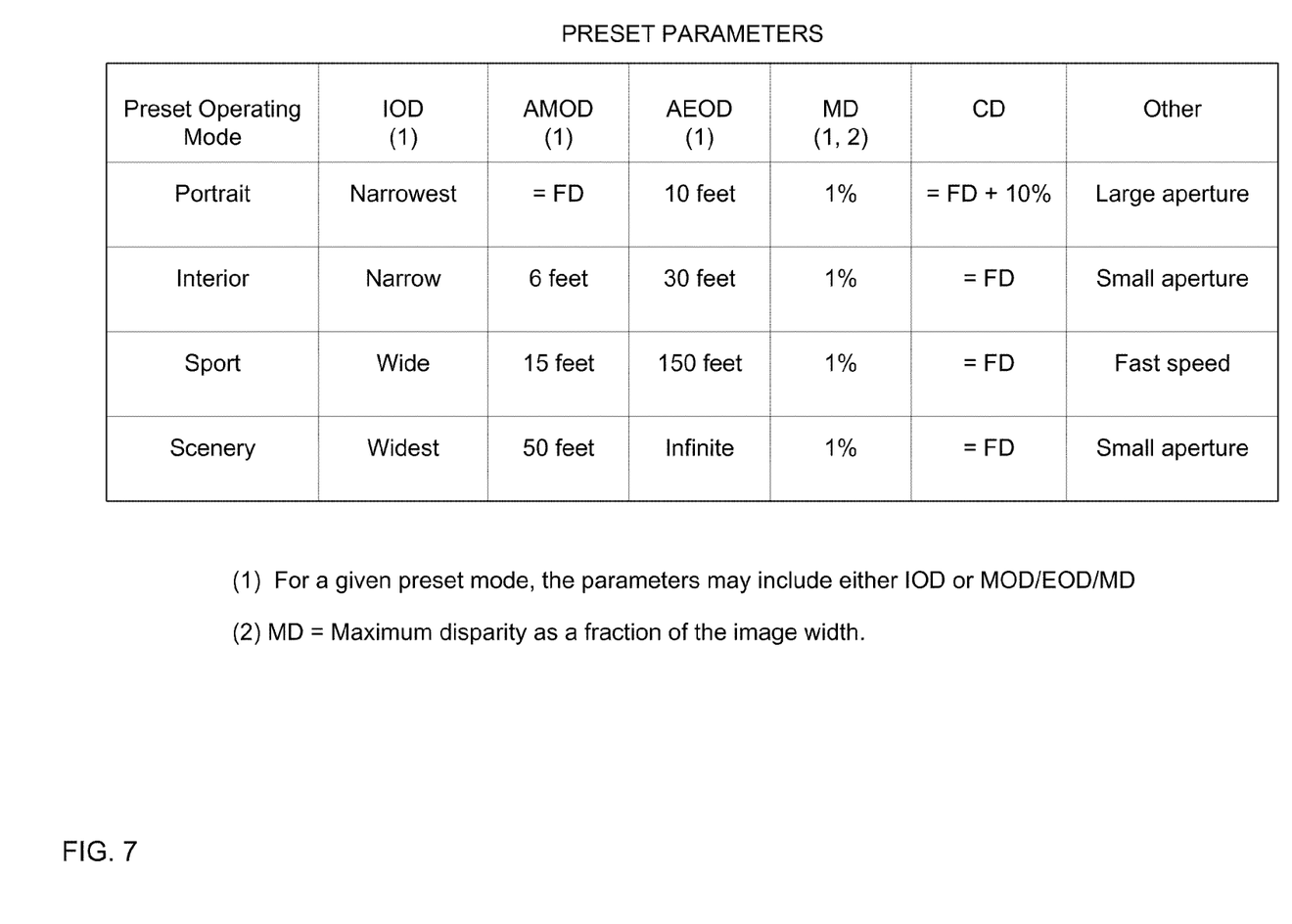
FIG. 7 is a table of exemplary stereo parameters for a plurality of preset operating modes of a stereographic camera.

FIG. 7 shows a table listing preset stereo parameters for four preset operating modes (portrait, interior, sport, and scenery) of a stereographic camera system such as the stereographic camera system 300. The number and choice of preset operating modes is exemplary. A stereographic camera system may have more or fewer than four preset operating modes. A stereographic camera system may have other preset operating modes in addition to, or instead of, any or all of portrait, interior, sport, and scenery. The preset parameter values listed in FIG. 7 for each exemplary preset operating mode are also exemplary. The preset parameter values for any preset operating mode may be based, at least in part, on features of the camera system including, for example, image sensor size and lens focal length and aperture ranges.

For any given preset operating mode, the associated preset parameters may include in interocular distance parameter IOD. The IOD parameter may be set in consideration of the assumed distance to the objects within the scene to be recorded. A widest IOD value may be preset for the scenery preset operating mode to insure some suggestion of three-dimensionality when recording far distance objects. The narrowest IOD may be preset for the portrait preset operating mode, in part to avoid image distortion that can occur due to a large convergence angle required when a wide IOD is used in combination with a short focus distance.

As an alternative to a preset interocular distance, the preset parameters may include a maximum disparity parameter MD and at least one of an assumed minimum object distance AMOD and an assumed extreme object distance AEOD. The MD and AMOD and/or AEOD parameters may be used to determine a required EOD as previously described. In the example of FIG. 7, MD is a constant value for all four exemplary preset operating modes, but different values of MD may be defined for some or all preset operating modes. The AMOD and AEOD values in the example of FIG. 7 are arbitrary but reasonable for the exemplary preset operating modes. Other values for AMOD, AEOD, and MD may be used.

The preset parameters may include a convergence distance to focus distance offset parameter. In the example of FIG. 7, the convergence distance is set equal to the focus distance for all preset operating modes except the portrait mode. Setting the convergence distance equal to the focus distance causes the primary scene object to appear to be at the image plane when the stereographic image is viewed. In the portrait preset operating mode, the convergence distance to focus distance offset may be set, for example, at 10% of the focus distance such that the portrait subject may appear to be slightly in front of the image plane.

The preset parameters for at least some preset operating modes may include parameters that are not unique to stereographic camera systems. In the example of FIG. 7, the preset parameters for the interior and scenery preset operating modes include setting the camera lenses to a small aperture to provide a large depth of focus. Conversely, the preset parameters for the portrait preset operating mode may include setting the camera lenses to a large aperture to provide a small depth of focus such that object behind the portrait subject are not in focus. The preset parameters for the sport preset operating mode may include setting a fast shutter speed or short exposure time to freeze moving subjects.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A stereographic camera system, comprising:
   a left camera and a right camera including respective lenses;
   an interface for receiving a selection of a selected stereographic imaging mode from three or more preset stereographic imaging modes;
   a preset parameter memory storing one or more preset stereo parameters associated with each of the three or more preset stereographic imaging modes; and
   an interocular distance mechanism to set an interocular distance between the left camera and the right camera based on, at least in part, the one or more preset stereo parameters associated with the selected stereographic imaging mode, wherein
      each of the three of more preset stereographic imaging modes is associated with a respective scene to be imaged,
      the one or more preset stereo parameters associated with each of the three or more preset stereographic imaging modes are preset based on assumed distances to objects within the respective scene, and
      the set interocular distance differs between at least some of the three or more preset stereographic imaging modes.

2. The stereographic camera system of claim 1, wherein
   the one or more preset stereo parameters associated with the selected stereographic imaging mode include a preset interocular distance, and
   the interocular distance mechanism sets the interocular distance in accordance with the preset interocular distance.

3. The stereographic camera system of claim 2, further comprising:
   a convergence angle mechanism to set a convergence angle between the left camera and the right camera based on, at least in part, the set interocular distance and a focus distance of the lenses.

4. The stereographic camera system of claim 3, wherein
   the one or more preset stereo parameters associated with the selected stereographic imaging mode include a preset focus distance to convergence distance offset parameter, and
   the convergence angle mechanism sets the convergence angle based on the set interocular distance, the focus distance, and the focus distance to convergence distance offset parameter.

5. The stereographic camera system of claim 1, wherein
   the one or more preset stereo parameters associated with the selected stereographic imaging mode include an assumed extreme object distance and an assumed minimum object distance, and
   the interocular distance mechanism sets the interocular distance in accordance with a predetermined maximum disparity parameter, a focus distance of the lenses, a focal length of the lenses, and the assumed extreme object distance and the assumed minimum object distance.

6. The stereographic camera system of claim 5, wherein the one or more preset stereo parameters associated the selected stereographic imaging mode include the predetermined maximum disparity.

7. The stereographic camera system of claim 5, wherein the predetermined maximum disparity is a common value for all of the plurality of three or more preset stereographic imaging modes.

8. The stereographic camera system of claim 5, further comprising:
   a convergence angle mechanism to set a convergence angle between the left camera and the right camera based on, at least in part, the set interocular distance and the focus distance of the lenses.

9. The stereographic camera system of claim 8, wherein
   the one or more preset stereo parameters associated with the selected stereographic imaging mode include a preset focus distance to convergence distance offset parameter, and
   the convergence angle mechanism sets the convergence angle based on the set interocular distance, the focus distance, and the focus distance to convergence distance offset parameter.

10. The stereographic camera system of claim 5, further comprising:
a controller coupled to the interface, the preset mode parameter memory, and the interocular distance mechanism, the controller to perform actions comprising:
receiving data indicative of the selected stereographic imaging mode from the interface,
retrieving preset parameters associated with the selected stereographic imaging mode from the preset mode parameter memory,
calculating a required interocular distance from the retrieved preset parameters, the predetermined maximum disparity, and the focus distance and the focal length of the lenses, and
sending data indicative of the required interocular distance to the interocular distance mechanism.

11. The stereographic camera system of claim 1, wherein the preset parameter memory further storing one or more of a lens aperture, a shutter speed, an exposure time, and electronic flash parameters associated with at least some of the three or more preset operating stereographic imaging modes.

12. A method for controlling a stereographic camera, comprising:
receiving a selection of a selected stereographic imaging mode from three or more preset stereographic imaging modes;
retrieving one or more preset stereo parameters associated with the selected stereographic imaging mode from a preset parameter memory; and
setting an interocular distance between a left camera and a right camera based on, at least in part, the retrieved one or more preset stereo parameters, wherein
each of the three of more preset stereographic imaging modes is associated with a respective scene to be imaged,
the one or more preset stereo parameters associated with each of the three or more preset stereographic imaging modes are preset based on assumed distances to objects within the respective scene, and
the set interocular distance differs between at least some of the there or more preset stereographic imaging modes.

13. The method for controlling a stereographic camera of claim 12, wherein
the one or more preset stereo parameters associated with the selected stereographic imaging mode include a preset interocular distance, and
setting the interocular distance comprises setting the interocular distance in accordance with the preset interocular distance.

14. The method for controlling a stereographic camera of claim 13, wherein the left and right cameras have associated left and right lenses, the method further comprising:
setting a convergence angle between the left camera and the right camera based on, at least in part, the set interocular distance and a focus distance of the lenses.

15. The method for controlling a stereographic camera of claim 14, wherein
the one or more preset stereo parameters associated with the selected stereographic imaging mode include a preset focus distance to convergence distance offset parameter, and
setting the convergence distance comprises setting the convergence angle based on the set interocular distance, the focus distance, and the focus distance to convergence distance offset parameter.

16. The method for controlling a stereographic camera of claim 12, wherein
the one or more preset stereo parameters associated with the selected stereographic imaging mode include both of an assumed extreme object distance and an assumed minimum object distance, and
setting the interocular distance comprises setting the interocular distance in accordance with a predetermined maximum disparity parameter, a focus distance of the lenses, a focal length of the lenses, and the assumed extreme object distance and the assumed minimum object distance.

17. The method for controlling a stereographic camera of claim 16, wherein the one or more preset stereo parameters associated with the selected stereographic imaging mode include the predetermined maximum disparity.

18. The method for controlling a stereographic camera of claim 16, wherein the predetermined maximum disparity is a common value for all of the three or more preset stereographic imaging modes.

19. The method for controlling a stereographic camera of claim 16, further comprising:
setting a convergence angle between the left camera and the right camera based on, at least in part, the set interocular distance and the focus distance of the lenses.

20. The method for controlling a stereographic camera of claim 19, wherein
the one or more preset stereo parameters associated with the selected stereographic imaging mode include a preset focus distance to convergence distance offset parameter, and
setting the convergence angle comprises setting the convergence angle based on the set interocular distance, the focus distance, and the focus distance to convergence distance offset parameter.

21. The method for controlling a stereographic camera of claim 16, wherein the setting the interocular distance comprises setting the interocular distance in accordance with the formula $$IOD = \text{minimum}(IOD_{EOD}, IOD_{MOD})$$

wherein
IOD=the interocular distance
$IOD_{EOD}=[CD \times AEOD \times MD \times W]/[(AEOD-CD) \times FL]$
$IOD_{MOD}=[CD \times AMOD \times MD \times W]/[(CD-AMOD) \times FL]$
W=a width of an image sensor within each camera
FL=the focal length of the lenses
AEOD=the assumed extreme object distance
AMOD=the assumed minimum object distance
MD=the predetermined maximum disparity as a fraction of a width of a scene recorded by the stereographic camera
CD=a convergence distance.

22. The method for controlling a stereographic camera of claim 21, wherein
the one or more preset stereo parameters associated with the selected stereographic imaging mode include a preset focus distance to convergence distance offset parameter, and
the convergence distance CD is determined based on the focus distance FD of the lenses and the focus distance to convergence distance offset parameter.

23. The method for controlling a stereographic camera of claim 21, wherein
the stereographic camera is a stereographic video camera, and
at least one of the focus distance and the focal length are varied during a video take.

24. The method for controlling a stereographic camera of claim 23, wherein the interocular distance is varied during the video take.

25. The method for controlling a stereographic camera of claim 24, wherein the method is performed continuously in near-real time.

26. The method for controlling a stereographic camera of claim 23, wherein the focal length and focus distance of the lenses are set by operator actions.

27. The method for controlling a stereographic camera of claim 23, wherein
   the focal length of the lenses is set by an operator action, and
   the focus distance of the lenses is set by an autofocus subsystem.

28. The method for controlling a stereographic camera of claim 12, further comprising, for at least some of the three or more preset stereographic imaging modes:
   retrieving, from the preset parameter memory, a lens aperture parameter associated with the selected stereographic imaging mode
   setting respective apertures of the lenses in accordance with the lens aperture parameter.

29. The method for controlling a stereographic camera of claim 12, further comprising, for at least some of the three or more preset stereographic imaging modes:
   retrieving, from the preset parameter memory, a shutter speed parameter and/or an exposure time parameter associated with the selected stereographic imaging mode, and
   operating the camera in accordance with the shutter speed parameter and/or the exposure time parameter.

\* \* \* \* \*

UNITED STATES PATENT AND TRADEMARK OFFICE
CERTIFICATE OF CORRECTION

| | | |
|---|---|---|
| PATENT NO. | : 8,265,477 B2 | Page 1 of 1 |
| APPLICATION NO. | : 12/752088 | |
| DATED | : September 11, 2012 | |
| INVENTOR(S) | : Vincent Pace and Patrick Campbell | |

It is certified that error appears in the above-identified patent and that said Letters Patent is hereby corrected as shown below:

Column 12, Line 47: delete "plurality of".

Signed and Sealed this
Sixth Day of November, 2012

David J. Kappos
*Director of the United States Patent and Trademark Office*